United States Patent [19]

Pirz et al.

[11] 4,400,828

[45] Aug. 23, 1983

[54] WORD RECOGNIZER

[75] Inventors: Frank C. Pirz, Madison; Lawrence R. Rabiner, Berkeley Heights; Jay G. Wilpon, Warren, all of N.J.

[73] Assignee: Bell Telephone Laboratories, Incorporated, Murray Hill, N.J.

[21] Appl. No.: 248,547

[22] Filed: Mar. 27, 1981

[51] Int. Cl.³ ............................ G10L 1/00; G06K 9/62
[52] U.S. Cl. .................................. 382/30; 179/1 SB; 382/1; 382/34
[58] Field of Search .......... 340/146.3 WD, 146.3 AQ, 340/146.3 Q, 146.3 M, 146.3 A; 179/1 SB, 1 SD, 1 SA; 382/1, 16, 30, 33, 34, 36; 343/5 MM; 358/105–108

[56] References Cited

U.S. PATENT DOCUMENTS

| | | | |
|---|---|---|---|
| 3,829,831 | 8/1974 | Yamamoto et al. | 340/146.3 MA |
| 4,027,284 | 5/1977 | Hoshino et al. | 340/146.3 AQ |
| 4,058,795 | 11/1977 | Balm | 340/146.3 WD |
| 4,200,861 | 4/1980 | Hubach et al. | 340/146.3 Q |
| 4,288,782 | 9/1981 | Bader et al. | 340/146.3 Q |
| 4,355,302 | 10/1982 | Aldefeld et al. | 340/146.3 Q |

*Primary Examiner*—Leo H. Boudreau
*Attorney, Agent, or Firm*—Jack S. Cubert; Kurt C. Olsen

[57] ABSTRACT

An input word is recognized as one of a set of reference words. A set of word distance signals representative of the correspondence of the input word to the reference words is generated. A set of weighted word distance signals is also generated. Responsive to the word distance signals and the weighted word distance signals, the reference word that most closely corresponds to the input word is selected.

16 Claims, 6 Drawing Figures

WORD RECOGNIZER

BACKGROUND OF THE INVENTION

Our invention relates to speech analysis systems and, more particularly, to arrangements for word recognition.

Word recognition arrangements permit direct input to communication, data processing and control systems. Such arrangements generally have a reference vocabulary stored as digital templates. A written or spoken input is converted to digital form and compared to the reference templates for identification. It may be difficult, however, to accurately identify the input amongst reference words which are similar. In a reference word vocabulary comprised of, for example, spoken letters of the alphabet, acoustic similarities may impede identification. Letters such as "X, S and F," and "B, C and D" are acoustically confusable and therefore difficult to discriminate accurately.

A prior character recognizer, disclosed in U.S. Pat. No. 4,058,795, issued Nov. 15, 1977 to G. J. Balm, resolves questionable identification of an input character by considering surrounding characters. The surrounding characters are each classified into a group according to a confusability table. The groups are used to determine a context code. The context code is used to select one of the group constituents as the correct identification of the questionable input character. The Balm arrangement assumes that accurately recognized characters surround the questionable character. There are, however, situations in which the identity of adjacent input characters is doubtful. Contextual analysis, as in Balm, may be of limited effectiveness.

In U.S. Pat. No. 4,027,284, issued May 31, 1977 to Hoshino et al, a recognition system for machine printed characters divides a plurality of reference patterns into groups of characters having common pattern elements. Common pattern elements define a standard pattern for each group. The standard pattern which is less than a fixed difference value from an input character is determined. The differences between noncommon pattern elements of characters in the determined group and the input are obtained. The input is identified as the character having the minimum difference value. The Hoshino system may improve recognition accuracy where the number of noncommon pattern elements is fixed, as with machine printed characters. Hoshino may not, however, accurately discriminate between similar characters having a variable pattern of noncommon elements.

It is thus an object of the invention to provide an improved arrangement for identifying an input as one word within a reference vocabulary which includes similar and confusable words.

SUMMARY OF THE INVENTION

The invention is directed to an arrangement for recognizing an input word as one of a set of reference words. Word distance signals are generated representative of the correspondence of the input word to each reference word. Weighted word distance signals are also generated. Responsive to the word distance signals and the weighted word distance signals, the reference word which most corresponds to the input word is selected.

In an embodiment illustrative of the invention, a set of reference words are segregated into predetermined classes according to acoustic similarity. Reference word feature templates corresponding to the reference words are stored. The templates comprise a fixed number of time frames. A spoken input word is digitally encoded. Responsive to the encoded word, input word feature templates, comprising the fixed number of time frames, are generated. A set of frame distance signals representative of the correspondence of each frame of the input word feature template to each frame of each reference word feature template is obtained. The frame distance signals are combined to develop word distance signals representative of the correspondence of the input word to each of the reference words. Responsive to the word distance signals, the class which corresponds most to the input word is selected. A stored set of predetermined weight templates represents the expected frame by frame similarity between reference words which belong to the same class. Weight templates and frame distance signals which belong to the selected class are combined to obtain weighted word distance signals. The weighted word distance signal which most corresponds to the input word is identified. The identified weighted word distance signal specifies the reference word which is the best candidate for recognizing the input word.

DETAILED DESCRIPTION

Figure 1:
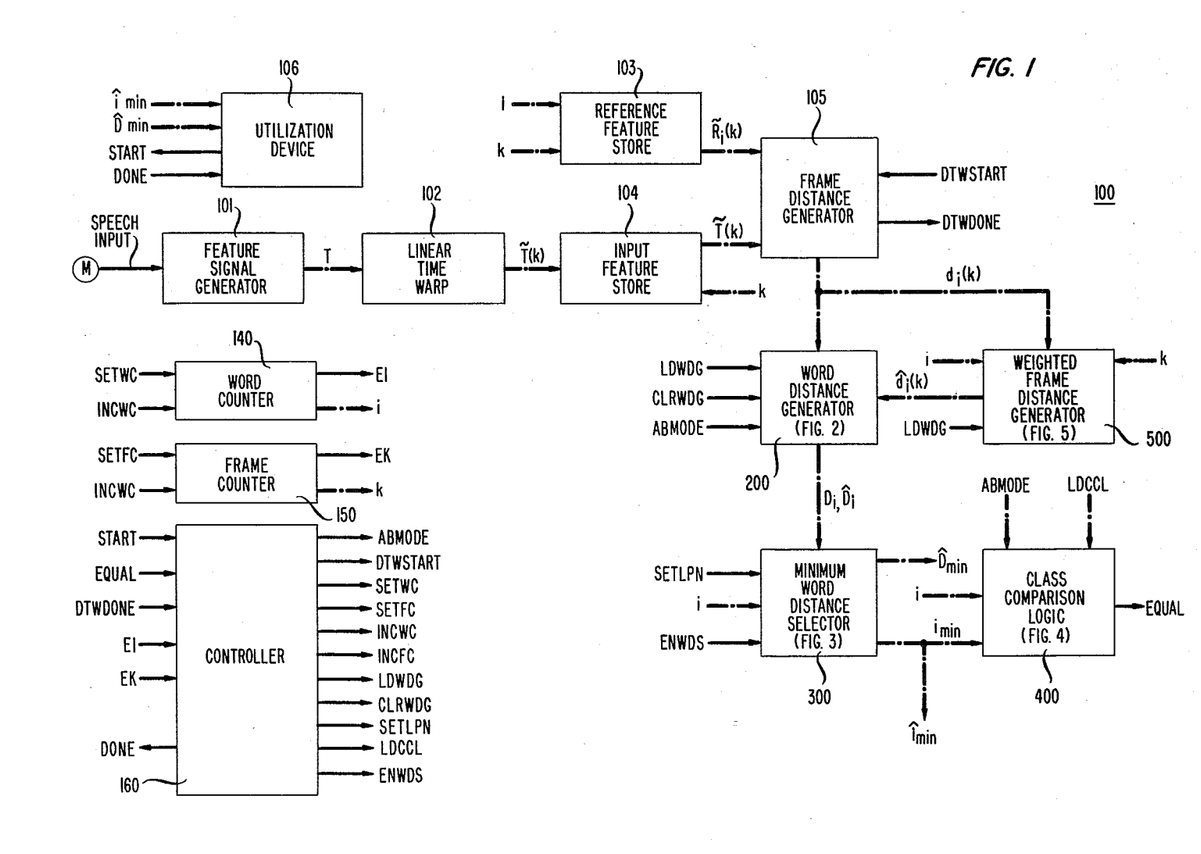
FIG. 1 depicts a general block diagram of a word recognizer illustrative of the invention.

FIG. 1 shows a general block diagram of a word recognizer 100 illustrative of the invention. The system of FIG. 1 may be used to identify a spoken utterance. Alternatively, the word recognition arrangement may comprise a general purpose computer, for example, adapted to perform the signal processing functions described with respect to FIG. 1 in conjunction with a read-only memory (ROM).

Speech is applied to the input of feature signal generator 101 to obtain acoustic feature signals T on the basis of linear prediction analysis well known in the art. Alternatively, spectral, formant derived, or other feature signals may be used. Feature signals T are normalized and warped to a standard duration of, for example, 40 time frames in linear time warp 102. Normalization and warp methods of signal processing are further described in the article by C. S. Myers, L. R. Rabiner and A. E. Rosenberg entitled, "Performance Tradeoffs in Dynamic Time Warping Algorithm for Isolated Word Recognition," *IEEE Transactions on Acoustics, Speech, and Signal Processing*, vol. ASSP-28, pp. 622-635, December, 1980.

Normalized and warped input feature signals $\tilde{T}(k)$ are stored in input feature store 104. The parenthetical k of $\tilde{T}(k)$ is an index which specifies a particular frame of the input. The range of k may be given as k=0, 1, ... K. In the present illustration, there are 40 time frames and K is therefore equal to 39. Previously obtained feature templates $\bar{R}_i(k)$ for reference words are stored in reference feature store 103. The subscript i of $\bar{R}_i(k)$ is an index which specifies a particular reference word and the parenthetical k, as before, specifies a frame. The range of i may be given as i=0, 1, ... I. The upper limit I may be equal to 38, for example, where the reference words comprise the alphabet, the numerals 0 through 9, and the command words "STOP," "ERROR" and "REPEAT". For purposes of illustration, however, the reference word vocabulary consists of twelve words: A, B, C, D, F, J, K, S, X, 6, 8 and REPEAT. The range of word index i may therefore be given as i=0, 1, ... 11.

Responsive to a comparison of input feature template $\bar{T}(k)$ and the set of reference feature templates $\bar{R}_i(k)$, a set of frame distance signals $d_i(k)$ are formed in frame distance generator 105. Dynamic time warp signal processing, well known in the art, may be employed in distance generator 105 to obtain the frame distance signals $d_i(k)$.

The frame distance signals $d_i(k)$ are applied to word distance generator 200 and weighted frame distance generator 500. In word distance generator 200, the frame distance signals $d_i(k)$ are combined to form word distance signals $D_i$ for each word index signal i=0, 1, ... 11. Responsive to the word distance signals $D_i$, the minimum word distance signal $D_{min}$ and the corresponding word index signal $i_{min}$ are obtained in minimum word distance selector 300. Responsive to minimum word index signal $i_{min}$, acoustic equivalence class signal $\emptyset_{min}$ is obtained in class comparison logic 400.

In weighted frame distance generator 500, the frame distance signals $d_i(k)$ are combined with weight templates $\hat{W}_i(k)$ to obtain weighted frame distance signals $\hat{d}_i(k)$. The weighted frame distance signals $\hat{d}_i(k)$ for each word i which belongs to acoustic equivalence class $\emptyset_{min}$ are combined in word distance generator 200 to form weighted word distance signals $\hat{D}_i$. In minimum word distance selector 300, the minimum weighted word distance signal $\hat{D}_{min}$ is selected from the weighted word distance signals $\hat{D}_i$. The corresponding word index signal $\hat{i}_{min}$ is output to utilization device 106. Signal $\hat{i}_{min}$ designates the reference word which is the best candidate for identifying the input.

Controller 160 is a microprocessor arrangement such as described in the *Microproducts Hardward Systems Reference*, published by Data General Corporation, 1979, or other microprocessor systems well known in the art. The microprocessor is operated in accordance with instruction codes stored in an incorporated read only memory. The instruction codes are listed in FORTRAN language form in Appendix 1.

Figure 6:
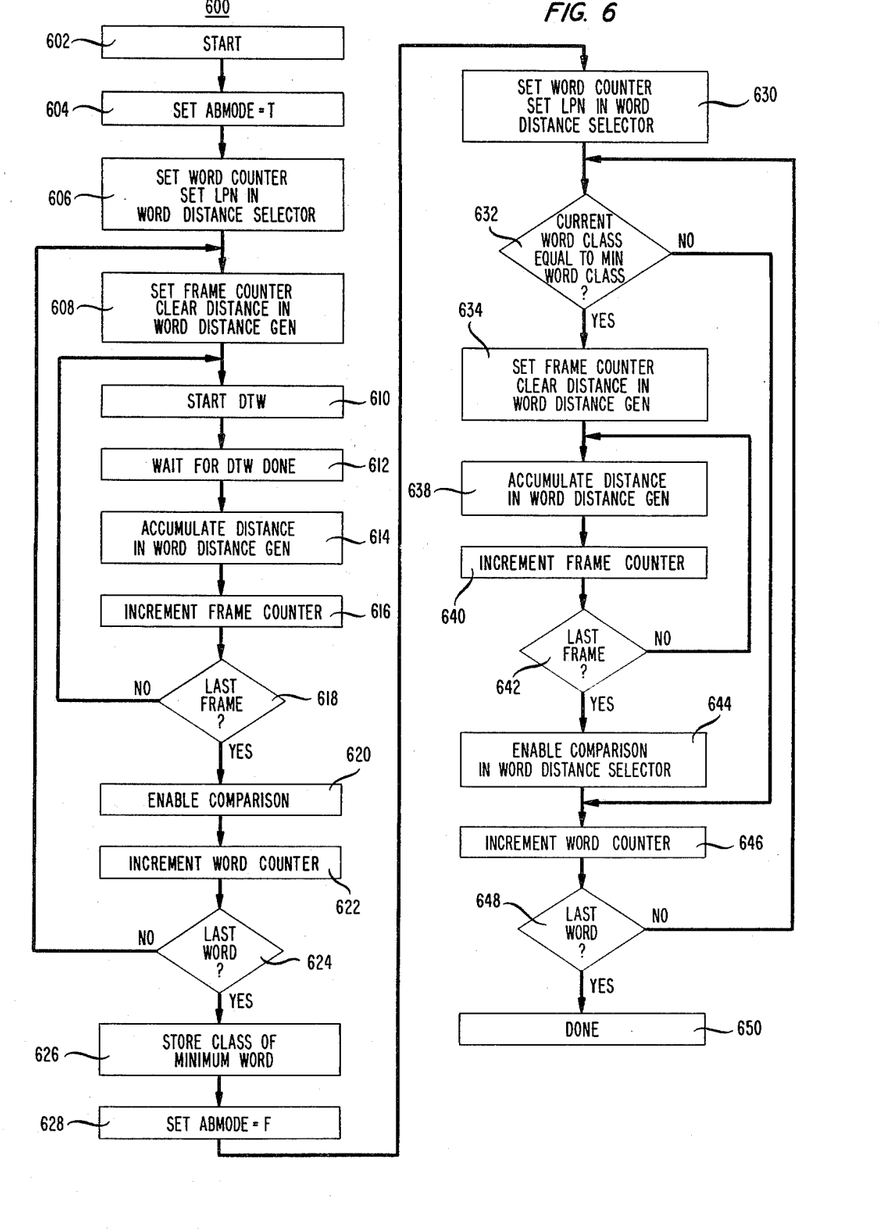
FIG. 6 shows flow diagram descriptive of the operation of the circuits in FIGS. 1 through 5.

The sequence of operations in the circuitry of word recognizer 100 is shown by flow diagram 600 FIG. 6. Responsive to signal START from utilization device 106, as shown by operation box 602 in FIG. 6, controller 160 is adapted to commence the operation of word recognition 100.

Word recognizer 100 operates in one of two modes, A or B, as determined by signal ABMODE from controller 160. Signal ABMODE is true during mode A operation, as shown by operation box 604 in FIG. 6, and is false during mode B operation of word recognizer 100.

Figure 3:
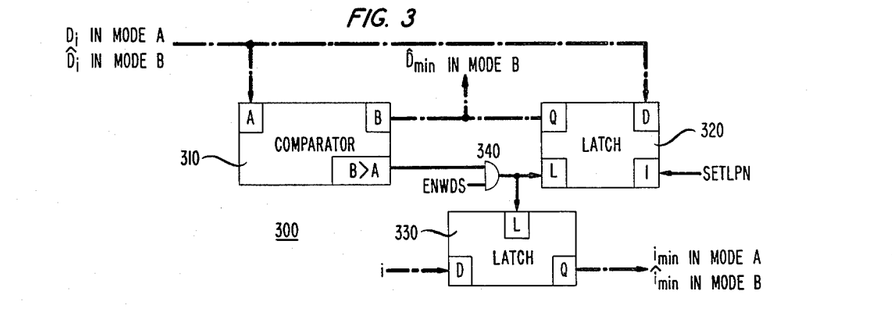
FIG. 3 shows a detailed block diagram of a minimum word distance selector useful in the circuit of FIG. 1.

In mode A operation, word counter 140 and frame counter 150 are initially set to zero by signals SETWC and SETFC from controller 160. Word index signal i from word counter 140 and frame index signal k from frame counter 150 are thereby both zero. Responsive to signal SETLPN from controller 160, latch 320 in FIG. 3 is set to its largest possible number. This sequence of initialization operations is shown by operation boxes 606 and 608 in FIG. 6.

Responsive to index signals i and k, the fisst frame of the first reference word, reference feature signal $\bar{R}_O(O)$, is output from reference feature store 103. Responsive to index signal k, the first frame of the input word, input feature signal $\bar{T}(O)$, is output from input feature store 104. Responsive to the DTWSTART signal from controller 160, as shown by operation box 610 of FIG. 6, frame distance signal $d_O(O)$ is determined in frame distance generator 105 from feature signals $\bar{R}_O(O)$ and $\bar{T}(O)$. Signal DTWDONE from generator 105, as shown by operation box 612, is applied to controller 160 after frame distance signal $d_O(O)$ is generated. Frame distance signals $d_i(k)$ are accumulated, as shown by operation box 614 and described below with reference to word distance generator 200. Responsive to signal DTWDONE, signal INCFC from controller 160 is applied to frame counter 150 to increment frame index signal k to k=1, as shown by operation box 616. Responsive to the DTWSTART signal from controller 160, frame distance signal $d_O(L)$ is generated in frame distance generator 105. After signal $d_O(L)$ is generated, signal DTWDONE is output from generator 105. Frame index signal k is incremented and the preceding operations repeated, as shown by decision box 618, until forty frame distance signals are obtained: $d_O(k)$, k=0, 1, ... 39. When k=39, frame counter 150 outputs signal EK. Responsive to signal EK, signal ENWDS from controller 160 is applied to enable comparison of word distance signals, as shown by operation box 620 and described below with reference to minimum word distance selector 300. Signal INCWC from controller 160 is applied to increment the output i of word counter 140, as shown by operation box 622. If i is not the last word, a new set of forty frame distance signals is obtained, as shown by decision box 624. Frame distance signals $d_i(k)$ are thereby generated for word index signals i=0 through 11.

Figure 5:
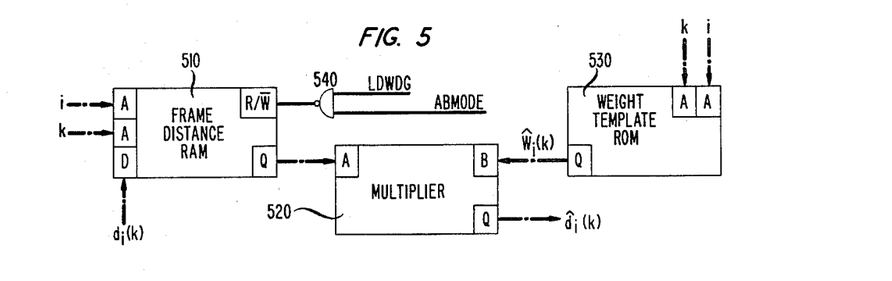
FIG. 5 shows a detailed block diagram of a weighted frame distance generator useful in the circuit of FIG. 1.

Index signals i and k from counters 140 and 150 are also applied to the address terminals of RAM 510 in FIG. 5. RAM 510 may be, for example, a type 74S207 circuit made by Texas Instruments, Incorporated. Frame distance signals $d_i(k)$ from generator 105 are applied to the data terminals of RAM 510. Signals LDWDG and ABMODE are applied from controller 160 to the inputs of NAND-gate 540. The output of NAND-gate 540, which is false, is applied to the R/$\overline{W}$ terminal of RAM 510. RAM 510 thereby stores frame distance signals $d_i(k)$ during mode A at memory locations addressed by signals i and k. The frame distance signals $d_i(k)$ are later retrieved from RAM 510 during mode B operation.

Figure 2:
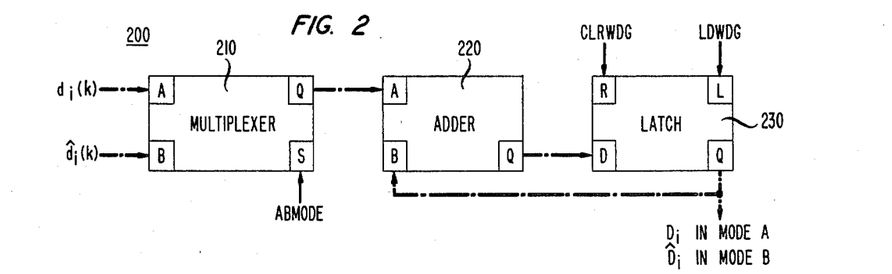
FIG. 2 shows a detailed block diagram of a word distance generator useful in the circuit of FIG. 1.

Continuing with mode A operation and referring to word distance generator 200 in FIG. 2, signal ABMODE from controller 160 is applied to the select terminal S of multiplexer 210, the A input of multiplexer 210 being thereby selected. Multiplexer 210 may be, for example, a type 74157 circuit made by Texas Instruments, Incorporated. Frame distance signals $d_i(k)$ input at the A terminal of multiplexer 210 are output at the Q terminal of the multiplexer and applied to the A input of adder 200. Adder 220 may be, for example, a type 74283 circuit made by Texas Instruments, Incorporated. The B input of adder 220 is connected to the Q output of latch 230. Latch 230 may be, for example, a type 74273 circuit made by Texas Instruments, Incorporated. The D input terminal of latch 230 is connected to the Q output of adder 220. For summing operation, latch 230 is cleared by signal CLRWDG from controller 160, as shown by operation box 608 in FIG. 6. After each distance signal $d_i(k)$ is generated, signal LDWDG from controller 160 is applied to the load terminal of latch 230, as shown by operation box 614. A total of 40 frame distance signals are thereby summed in adder 220 and latch 230 to obtain a word distance signal $D_i$. For the next word i, latch 230 is again cleared by signal CLRWDG and the summing operations are repeated. A total of twelve word distance signals $D_i$ are thereby generated for i=0, 1, ... 11.

Referring to minimum word distance selector 300 in FIG. 3, as each word distance signal $D_i$ is generated, it is applied to the A input of comparator 310 and the D input of latch 320. Comparator 310 may be, for example, a type 7485 circuit made by Texas Instruments, Incorporated. The Q output of latch 320 is connected to the B input of comparator 310. It will be recalled, with reference to operation box 606, that latch 320 was set initially to its largest possible number by signal SETLPN from controller 160. Whenever a succeeding $D_i$ signal is less than the current value in latch 320, a true signal is applied from the B>A output of comparator 310 to AND-gate 340. AND-gate 340 is enabled during mode A operation by signal ENWDS from controller 160. The output of AND-gate 340 causes latch 320 to load the value of the succeeding $D_i$ signal. The output of AND-gate 340 also causes latch 330 to load the index signal i, from counter 140, which corresponds to the word distance signal $D_i$ stored in latch 320. Comparator 310 and latches 320 and 330 are thereby arranged to obtain the minimum word distance signal, $D_{min}$, and the corresponding index signal, $i_{min}$, from the set of all word distance signals $D_i$, for i=0 to 11.

Table I shows, for example, a possible list of word distance signals $D_i$ and corresponding word index signals i. Word distance signal $D_9$ is equal to 14.8 and has the minimum magnitude of all members of the list. Minimum word distance signal $D_{min}$ is therefore equal to to 9.

TABLE I

| Reference Word Index Signal i | Word Distance Signal $D_i$ |
| --- | --- |
| 0 | 20.4 |
| 1 | 16.8 |
| 2 | 18.8 |
| 3 | 28.8 |
| 4 | 15.6 |
| 5 | 26.8 |
| 6 | 24.0 |
| 7 | 33.2 |
| 8 | 31.2 |
| 9 | 14.8 |
| 10 | 24.8 |
| 11 | 26.4 |

Figure 4:
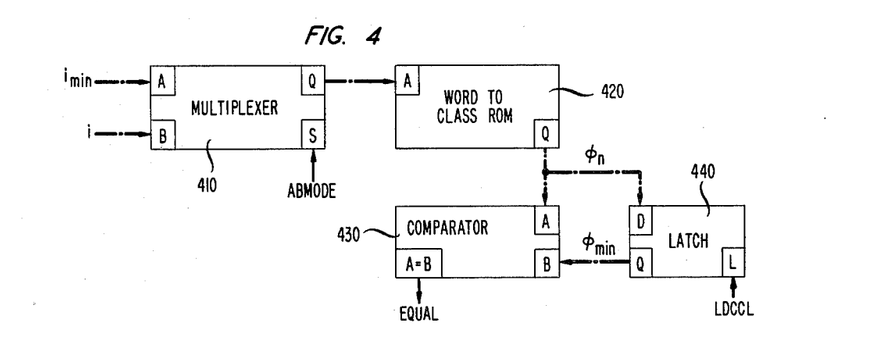
FIG. 4 shows a detailed block diagram of class comparison logic useful in the circuit of FIG. 1.

Referring to class comparison logic 400 in FIG. 4, index signal $i_{min}$ from latch 330 is applied to the A input of multiplexer 410. In mode A operation, signal ABMODE from controller 160 is true and the A input of multiplexer 410 is selected. Index signal $i_{min}$ is thereby output at the Q terminal of multiplexer 410 and applied to address terminal A of ROM 420.

A previously determined set of acoustic equivalence class signals $\emptyset_n$ are stored in ROM 420. ROM 420 may be, for example, a type 74S287 circuit made by Texas Instruments, Incorporated. Each acoustic equivalence class signal represents a group of reference words having a prescribed degree of similarity which may impede acoustic recognition. The 12 reference words of the present illustration may be segregated, as shown for example in Table II, into three groups of confusable words designated by acoustic equivalence class signals $\emptyset_0$, $\emptyset_1$, and $\emptyset_2$.

TABLE II

| Acoustic Equivalence Class Signal $\phi_n$ | Reference Word Index Signal i | Reference Word |
| --- | --- | --- |
| $\phi_0$ | 0 | B |
|  | 1 | C |
|  | 2 | D |
|  | 3 | REPEAT |
| $\phi_1$ | 4 | A |
|  | 5 | J |
|  | 6 | K |
|  | 7 | 8 |
| $\phi_2$ | 8 | F |
|  | 9 | S |
|  | 10 | X |
|  | 11 | 6 |

When index signal $i_{min}$ is applied to the address input A of ROM 420, the corresponding minimum acoustic equivalence class signal $\emptyset_{min}$, as given in Table II, is output at the Q terminal of the ROM. Thus, in the example where signal $i_{min}$ is equal to 9, signal $\emptyset_{min}$ is equal to $\emptyset_2$. Signal LDCCL is then applied from controller 160 to load latch 440 with signal $\emptyset_{min}=\emptyset_2$ from ROM 420, as shown by operation box 626 in FIG. 6.

Once the minimum acoustic class signal $\emptyset_{min}$ is stored in latch 440, the mode A operation of word recognizer 100 is complete. Signal ABMODE from controller 160 changes to false and the B mode of operation is selected, as shown by operaton box 628. In mode B, weighted word distance signals $\hat{D}_i$ for those reference words represented by acoustic equivalence class signal $\emptyset_{min}$ are generated. In the example where minimum acoustic equivalence class signal $\emptyset_{min}$ is equal to $\emptyset_2$, weighted word distance signals $\hat{D}_i$ for i=8, 9, 10 and 11 are generated. Signals i=8, 9, 10 and 11 correspond to the acoustically similar words "F, S, X and 6", as given in Table II. The minimum of the weighted word distance signals, $\hat{D}_{min}$, is obtained. The index signal $\hat{i}_{min}$, which corresponds to signal $\hat{D}_{min}$, is output to utilization device 106 as the index of the best reference word candidate for identification of the input word.

Referring now to mode B operation, word counter 140 is first reset to zero by signal SETWC from controller 160. Responsive to signal SETLPN from controller 160, latch 320 in FIG. 3 is set to its largest possible number. This sequence of initialization operations is shown by operation box 630 in FIG. 6. Signal i from counter 140 is then applied to the B input of multiplexer 410 in FIG. 4. Since signal ABMODE from controller 160 is false in mode B, the B input of multiplexer 410 is selected. Signal i is therefore applied to address input A of ROM 420. In response to signal i, ROM 420 outputs a corresponding acoustic equivalence class signal, $\emptyset_n$, as given in Table II. Signal $\emptyset_n$ is applied to the A input of comparator 430. Acoustic equivalence class signal $\emptyset_{min}$ from latch 440 is applied to the B input of comparator 430, as shown by decision box 632. If signals $\emptyset_n$ and $\emptyset_{min}$ are not equal, signal EQUAL from comparator 430 is false. Signal INCWC from controller 160 is applied to word counter 140 to increment signal i, as shown by operation box 806 in FIG. 8. For each signal i=0, 1, ... 11, as shown by decision boxes 632 and 648, the corresponding acoustic equivalence class signal $\emptyset_n$ is compared to minimum acoustic equivalence class signal $\emptyset_{min}$. In the example where minimum acoustic equivalence class signal $\emptyset_{min}$ in latch 440 is equal to $\emptyset_2$, signal EQUAL is true only for signals i=8, 9, 10 and 11, corresponding to acoustically similar words F, S, X and 6.

Signal ABMODE from controller 160 is applied to the input of NAND-gate 540 in FIG. 5. Since signal ABMODE is false in mode B, NAND-gate 540 outputs a true signal. The true signal from NAND-gate 540 is applied to the R/$\overline{W}$ terminal of RAM 510. RAM 510 is thereby adapted to output frame distance signals $d_i(k)$ during mode B.

Responsive to a true signal EQUAL from comparator 430, signal SETFC from controller 160 is applied to reset frame counter 150. Responsive to signal CLRWDG from controller 160, latch 230 in word distance generator 200 is also reset. These reset operations are shown by operation box 634 in FIG. 6. Index signals i and k from counters 140 and 150 are applied to the address terminals A of RAM 510. Frame distance signals $d_i(k)$ from memory locations in RAM 510 are thereby output responsive to signals i and k.

Index signals i and k from counters 140 and 150 are also applied to the address terminals of ROM 530. Predetermined weight templates $\hat{W}_i(k)$ from memory locations in ROM 530 are thereby output responsive to signals i and k.

The weight templates $\hat{W}_i(k)$ are representative of expected frame by frame dynamic time warp distances between words which belong to the same acoustic equivalence class. Considering, for example, a situation in which an input feature template represents the word "I" and a reference feature template represents the word "Y". Since the word "Y" is the same as the "I" with the addition of a prefix phoneme /w/, it is expected that the dynamic time warp distance between "I" and "Y" would be large only during initial frames. From the example, it may be seen that expected frame by frame dynamic time warp distances vary for different pairs of words under consideration.

More particularly, weight templates $\hat{W}_i(k)$ are developed (prior to the mode A or B operations of word recognizer 100) by considering a plurality of spoken repetitions of each reference word. Feature templates for repetitions of the same reference word i are compared by dynamic time warp signal processing to develop frame distance signals $d_{i,i}(k)$. The repetitions are combined to develop averaged frame distance signals $<d_{i,i}(k)>$. Variance signals $\sigma_{i,i}^2(k)$ are obtained corresponding to the variance of the averaged frame distance signals $<d_{i,i}(k)>$.

Feature templates for repetitions of a reference word i and a different reference word j, both i and j being members of the same acoustic class, are compared by dynamic time warp signal processing to develop frame distance signals $d_{j,i}(k)$. The repetitions are combined to develop averaged frame distance signals $<d_{j,i}(k)>$. Variance signals $\sigma_{j,i}^2(k)$ are obtained corresponding to the variance of the averaged frame distance signals $<d_{j,i}(k)>$.

Averaged frame distance signals $<d_{i,i}(k)>$ and $<d_{j,i}(k)>$, and variance signals $\sigma_{i,i}^2(k)$ and $\sigma_{j,i}^2(k)$ are combined according to the following equation (1) to develop pairwise weight signals $W_{j,i}(k)$:

$$W_{j,i}(k) = \frac{|<d_{i,i}(k)> - <d_{j,i}(k)>|}{[\sigma_{i,i}^2(k) + \sigma_{j,i}^2(k)]^{\frac{1}{2}}} \quad (1)$$

The pairwise weight signals $W_{j,i}(k)$ are combined according to the following equation (2) to develop the weight template signals $\hat{W}_i(k)$ which are stored in ROM 530:

$$\hat{W}_i(k) = \sum_j \frac{W_{j,i}(k)}{\sum_{k=1}^{k} W_{j,i}(k)} \quad (2)$$

The preceding signal processing operations described with reference to equations (1) and (2) represent a particular way to develop weight template signals $\hat{W}_i(k)$. It is to be understood that other signal processing operations may be applied to obtain weight template signals representative of expected distances without departing from the scope and spirit of the invention.

In FIG. 5, frame distance signals $d_i(k)$ from RAM 510 are applied to the A input of multiplier 520. Weight template signals $\hat{W}_i(k)$ from ROM 530 are applied to the B input of multiplier 520. Multiplier 520 may be, for example, a type MPY16HJ circuit made by TRW, Incorporated. Multiplier 520 forms the product of signals $d_i(k)$ and $\hat{W}_i(k)$ and thereby outputs weighted frame distance signals $\hat{d}_i(k)$.

Referring to word distance generator 200 in FIG. 2, signal ABMODE from controller 160 is applied to the select input S of multiplexer 210. Since signal ABMODE is false in mode B, the B input of multiplexer 210 is selected. It will be recalled, with reference to operation box 634, that latch 230 was reset to zero by signal CLRWDG from controller 160. Signal LDWDG from controller 160 is then applied to the L terminal of latch 230. Weighted frame distance signals $d_i(k)$ from multiplexer 210 are thereby summed by adder 220 and latch 230 (in the same manner as previously described with reference to signals $d_i(k)$ in mode A) to obtain weighted word distance signals $\hat{D}_i$, as shown by operation boxes 638 and 640 and decision box 642.

In the example where minimum acoustic equivalence class signal $\emptyset_{min}$ is equal to $\emptyset_2$, signal EQUAL from comparator 430 is true only for word index signals i=8, 9, 10 and 11. Weighted frame distance signals $\hat{d}_8(k)$, $\hat{d}_9(k)$, $\hat{d}_{10}(k)$, and $\hat{d}_{11}(k)$ are therefore summed respectively for frame index signals k=0, 1, ... 39 in adder 220 and latch 230 to develop weighted word distance signals $\hat{D}_8$, $\hat{D}_9$, $\hat{D}_{10}$ and $\hat{D}_{11}$.

Referring to minimum word distance generator 300 in FIG. 3, weighted word distance signals $\hat{D}_i$ from word distance generator 200 are applied to the A input of comparator 310 and the D input of latch 320. It will be recalled, with reference to operation box 630, that latch 320 was initially set to its largest possible number responsive to signal SETLPN from controller 160. Responsive to signal ENWDS from controller 160, the output of AND-gate 340 is applied load latches 320 and 330. The minimum weighted word distance signal $\hat{D}_{min}$ is thereby obtained at the Q output of latch 320 (in the same manner as previously described with reference to signals $D_i$ in mode A), as shown by operation boxes 644 and 646. The index signal $\hat{i}_{min}$, which corresponds to signal $\hat{D}_{min}$, is output at the Q terminal of latch 320. Index signal $\hat{i}_{min}$ is applied to utilization device 106 to designate the reference word which is the best candidate for identification of the input. Signal DONE from controller 160 is then applied to utilization device 106, as shown by operation box 650.

In the example where minimum acoustic equivalence class signal $\emptyset_{min}$ is equal to $\emptyset_2$, Table III shows, for example, a possible list of magnitudes for weighted word distance signals $\hat{D}_8$, $\hat{D}_9$, $\hat{D}_{10}$ and $\hat{D}_{11}$.

TABLE III

| Reference Word Index Signal i | Weighted Word Distance Signal $\hat{D}_j$ |
| --- | --- |
| 8 | 22.0 |
| 9 | 12.4 |
| 10 | 11.6 |
| 11 | 21.2 |

Weighted word distance signal $\hat{D}_{10}$ is equal to 11.6 and has the minimum magnitude of all members of the list. Signal $\hat{D}_{10}$ is therefore selected as the minimum weighted word distance signal $\hat{D}_{min}$ in minimum word distance generator 300. The corresponding index signal i in latch 330 of FIG. 3 is output as the minimum index signal $\hat{i}_{min} = 10$.

From Table II, it is seen that signal $\hat{i}_{min} = 10$, developed in mode B, corresponds to the reference word "X." In contrast, signal $i_{min} = 9$ from mode A corresponds to the reference word "S." Signal $\hat{i}_{min}$ from mode B is considered to represent the most probable candidate for identification of the input because it is obtained using weight template signals representative of expected frame by frame distances between acoustically similar words.

While the invention has been shown and described with reference to a preferred embodiment thereof, it is to be understood that various modifications and changes may be made by one skilled in the art without departing from the spirit and scope of the invention. For example, in some applications, it may be desirable to obtain a plurality of reference word candidates which are ranked for identification of the input. In mode A operation, the word distance signals $D_i$ may be operated from minimum to maximum magnitude. Likewise, in mode B operation, the weighted word distances $\hat{D}_i$ for all acoustic equivalence classes $\emptyset_n$ may be ordered from minimum to maximum magnitude. The orderings from both modes would then be used to obtain a final ranking of reference word candidates.

APPENDIX I

PROGRAM FOR CONTROLLER

```
C WORD RECOGNIZER
10 CONTINUE
   CALL WAITFOR (START)
C MODE A
   CALL OUTPUT (ABMODE = T)
C SET WORD COUNTER
C SET LPN IN WORD DISTANCE SELECT
   CALL OUTPUT (SETWC)
   CALL OUTPUT (SETLPN)
100 CONTINUE
C SET FRAME COUNTER
C CLEAR DISTANCE IN WORD DISTANCE GEN
   CALL OUTPUT (SETFC)
   CALL OUTPUT (CLRWDG)
150 CONTINUE
C RUN FRAME DISTANCE GEN
   CALL OUTPUT (DTWSTART)
   CALL WAITFOR (DTWDONE)
C ACCUMULATE DISTANCE IN WORD DISTANCE GEN
   CALL OUTPUT (LDWDG)
C GO TO NEXT FRAME
   CALL OUTPUT (INCFC)
   CALL INPUT (EK)
```

APPENDIX I-continued

PROGRAM FOR CONTROLLER

```
   IF (IK.NE.1) GO TO 150
C ENABLE DISTANCE COMPARISON
   CALL OUTPUT (ENWDS)
C GO TO NEXT WORD
   CALL OUTPUT (INCFC)
   CALL INPUT (EI)
   IF (EI.NE.1) GO TO 100
C STORE CLASS OF MINIMUM WORD
   CALL OUTPUT (LDCCL)
C MODE B
   CALL OUTPUT (ABMODE = F)
C SET WORD COUNTER
C SET LPN IN WORD DISTANCE SELECT
   CALL OUTPUT (SETWC)
   CALL OUTPUT (SETLPN)
200 CONTINUE
C TEST CURRENT WORD CLASS
   CALL INPUT (EQUAL)
   IF (EQUAL.EQ.0) GO TO 300
C SET FRAME COUNTER
C CLEAR DISTANCE IN WORD DISTANCE GEN
   CALL OUTPUT (SETFC)
   CALL OUTPUT (CLRWDG)
250 CONTINUE
C ACCUMULATE WEIGHTED DISTANCE
   CALL OUTPUT (LDWDG)
C GO TO NEXT FRAME
   CALL OUTPUT (INCFC)
   CALL INPUT (EK)
   IF (EK.NE.1) GO TO 250
C ENABLE DISTANCE COMPARISON
   CALL OUTPUT (ENWDS)
300 CONTINUE
C GO TO NEXT WORD
   CALL OUTPUT (INCWC)
   CALL INPUT (EI)
   IF (EI.NE.1) GO TO 200
C FINISHED
   CALL OUTPUT (DONE)
   GO TO 10
   END
```

What is claimed is:

1. Apparatus for recognizing an input word as one of a set of reference words comprising
   means for storing a plurality of reference word feature templates representative of said reference words;
   means responsive to said input word for generating an input word feature template;
   means responsive to said reference word feature templates and said input word feature template for identifying said input word as one of said reference words, characterized in that
   said input word identifying means (100) comprises
   means (105,200) responsive to said reference word feature templates and said input word feature template for generating a set of word distance signals;
   said reference word feature templates and said input word feature template each have a plurality of frames;
   said means for generating a set of word distance signals comprises means responsive to said reference word feature templates and said input word feature template for generating a set of frame distance signals representative of the similarity between frames of said reference word feature templates and said input word feature template, and means for combining said frame distance signals to produce said word distance signals;
   means (105, 200, 500) responsive to said reference word feature templates and said input word feature template for generating a set of weighted word distance signals; and means (300, 400) responsive to said word distance signals and said weighted word distance signals for selecting the reference word which most corresponds to said input word.

2. Apparatus as in claim 1 further characterized in that said reference words for which feature templates are stored belong to a predetermined set of equivalence classes, each class being representative of reference words which are within a prescribed degree of similarity; and said means for generating a set of weighted word distance signals comprises means for storing a plurality of weight templates representative of the expected similarity between frames of reference word feature templates for reference words which belong to the same equivalence class;

means responsive to said frame distance signals and said weight templates for generating weighted frame distance signals; and means for combining said weighted frame distance signals to produce said weighted word distance signals.

3. Apparatus as in claim 2 further characterized in that said means for selecting the reference word which most corresponds to said input word comprises means responsive to said word distance signals for selecting the equivalence class of the reference word representative of the word distance signal which most corresponds to said input word, means responsive to said weighted word distance signals for identifying the reference word of the selected equivalence class representative of the weighted word distance signal which most corresponds to said input word, whereby said identified reference word designates a candidate for recognition of the input word.

4. Apparatus as in claims 1 or 2 further characterized in that said input word feature template and said reference word feature templates are representative of acoustic characteristics of spoken words.

5. Apparatus as in claims 2 or 3 further characterized in that said equivalence classes are representative of reference words which are acoustically similar, and said frames are representative of discrete periods of time.

6. Apparatus as in claim 5 further characterized in that said reference word feature templates and said input word feature template each have the same number of time frames.

7. A method for recognizing an input word as one of a set of reference words comprising the steps of storing a plurality of reference word feature templates representative of said reference words;

generating an input word feature template responsive to said input word;

identifying said input word as one of said reference words responsive to said reference word feature templates and said input word feature template, characterized in that said input word identifying step comprises generating a set of word distance signals responsive to said reference word feature templates and said input word feature template;

said reference word feature templates and said input word feature template each have a plurality of frames;

said step for generating a set of word distance signals comprises generating a set of frame distance signals representative of the similarity between frames of said reference word feature templates and said input word feature template responsive to said reference word feature templates and said input word feature template, and combining said frame distance signals to produce said word distance signals;

generating a set of weighted word distance signals responsive to said reference word feature templates and said input word feature template; and selecting the reference word which most corresponds to said input word responsive to said word distance signals and said weighted word distance signals.

8. A method for recognizing an input word as one of a set of reference words according to claim 7 further characterized in that said reference words for which feature templates are stored belong to a predetermined set of equivalence classes, each class being representative of reference words which are within a prescribed degree of similarity; and said step for generating a set of weighted word distance signals comprises storing a plurality of weight templates representative of the expected similarity between frames of reference word feature templates for reference words which belong to the same equivalence class;

generating weighted frame distance signals responsive to said frame distance signals and said weight templates; and combining said weighted frame distance signals to obtain said weighted word distance signals.

9. A method for recognizing an input word as one of a set of reference words according to claim 8 further characterized in that said step for selecting the reference word which most corresponds to said input word comprises selecting the equivalence class of the reference word representative of the word distance signal which most corresponds to said input word responsive to said word distance signals;

identifying the reference word of the selected equivalence class representative of the weighted word distance signal which most corresponds to said input word responsive to said weighted word distance signals, whereby said identified reference word designates a candidate for recognition of the input word.

10. A method for recognizing an input word as one of a set of reference words according to claims 7 or 8 further characterized in that said input word feature template and said reference word feature templates are representative of acoustic characteristics of spoken words.

11. A method for recognizing an input word as one of a set of reference words according to claims 8 or 9 further characterized in that said equivalence classes are representative of reference words which are acoustically similar, and said frames are representative of discrete periods of time.

12. A method for recognizing an input word as one of a set of reference words according to claim 11 further characterized in that said reference word feature templates and said input word feature template each have the same number of time frames.

13. Apparatus for recognizing a spoken input word as one of a set of reference words comprising means for storing a plurality of reference word feature templates representative of acoustic characteristics of said reference words; means responsive to said input word for generating an input word feature template representative of acoustic characteristics of said input word; means responsive to said reference word feature templates and said input word feature template for identifying said input word as one of said reference words; said input word identifying means including means responsive to said reference word feature templates and said input word feature templates for generating a set of word distance signals; said reference word feature templates and said input word feature template each have a plurality of frames; said reference words for which feature templates are stored belong to a predetermined set of equivalence classes, each class being representative of reference words which are within a prescribed degree of similarity;

said means for generating a set of word distance signals comprises means responsive to said reference word feature templates and said input word feature template for generating a set of frame distance signals representative of the similarity between frames of said reference word feature templates and said input word feature template, and means for summing said frame distance signals to product said word distance signals;

means responsive to said reference word feature templates and said input word feature template for generating a set of weighted word distance signals; said means for generating a set of weighted word distance signals comprises means for storing a plurality of weight templates representative of the expected similarity between frames of reference word feature templates for reference words which belong to the same equivalence class, means responsive to said frame distance signals and said weight templates for generating weighted frame distance signals, and means for summing said weighted frame distance signals to produce said weighted word distance signals; and means responsive to said word distance signals and said weighted word distance signals for selecting the reference word which most corresponds to said input word.

14. Apparatus as in claim 13 wherein said means for selecting the reference word which most corresponds to said input word comprises: means responsive to said word distance signals for selecting the equivalence class of the reference word representative of the minimum word distance signal; means responsive to said weighted word distance signals for identifying the reference word of the selected equivalence class representative of the minimum weighted word distance signal; whereby said identified reference word designates a candidate for recognition of the input word.

15. A method for recognizing a spoken input word as one of a set of reference words comprising storing a plurality of reference word feature templates representative of acoustic characteristics of said reference words; generating an input word feature template representative of acoustic characteristics of said input word responsive to said input word; identifying said input word as one of said reference words responsive to said reference word feature templates and said input word feature template;

said input word identifying step comprises generating a set of word distance signals responsive to said reference word feature templates and said input word feature template; said reference word feature templates and said input word feature template each have a plurality of frames; said reference words for which feature templates are stored belong to a predetermined set of equivalence classes, each class being representative of reference words which are within a prescribed degree of similarity;

said step for generating a set of word distance signals comprises generating a set of frame distance signals representative of the similarity between frames of said reference word feature templates and said input word feature template responsive to said reference word feature templates and said input word feature template, and summing said frame distance signals to produce said word distance signals;

generating a set of weighted word distance signals responsive to said reference word feature templates and said input word feature template; said step for generating a set of weighted word distance signals comprises storing a plurality of weight templates representative of the expected similarity between frames of reference word feature templates for reference words which belong to the same equivalence class, generating weighted frame distance signals responsive to said frame distance signals and said weight templates, and summing said weighted frame distance signals to produce said weighted word distance signals; and selecting the reference word which most corresponds to said input word responsive to said word distance signals and said weighted word distance signals.

16. A method for recognizing a spoken input word as one of a set of reference words according to claim 15 wherein said step for selecting the reference word which most corresponds to said input word comprises: selecting the equivalence class of the reference word representative of the minimum word distance signal responsive to said word distance signals;

identifying the reference word of the selected equivalence class representative of the minimum weighted word distance signal responsive to said weighted word distance signals; whereby said identified reference word designates a candidate for recognition of the input word.

* * * * *

UNITED STATES PATENT AND TRADEMARK OFFICE
CERTIFICATE OF CORRECTION

PATENT NO. : 4,400,828

DATED : August 23, 1983

INVENTOR(S) : Frank C. Pirz, Lawrence R. Rabiner and Jay G. Wilpon

It is certified that error appears in the above-identified patent and that said Letters Patent is hereby corrected as shown below:

Column 3, line 55, "FIG. 6" should read --in FIG. 6--. Column 4, line 8, "$R_o(O)$" should read --$\tilde{R}_0(0)$--; line 11, "$\tilde{T}(O)$" should read --$\tilde{T}(0)$--; line 14, "$d_o(O)$" should read --$d_0(0)$--; line 15, "$R_o(O)$" should read --$\tilde{R}_0(0)$--; line 16, "$\tilde{T}(O)$" should read --$\tilde{T}(0)$--; line 18, "$d_o(O)$" should read --$d_0(0)$--; line 26, "$d_o(L)$" should read --$d_0(1)$--; line 27, "$d_o(L)$" should read --$d_0(1)$--. Column 5, line 44, "equal to to" should read --equal to--. In Appendix I, column 10, line 3, "(IK.NE.1)" should read --(EK.NE.1)--.

Signed and Sealed this

Fifteenth Day of May 1984

[SEAL]

Attest:

GERALD J. MOSSINGHOFF

Attesting Officer

Commissioner of Patents and Trademarks